Figures 1, 3, 5, 6:
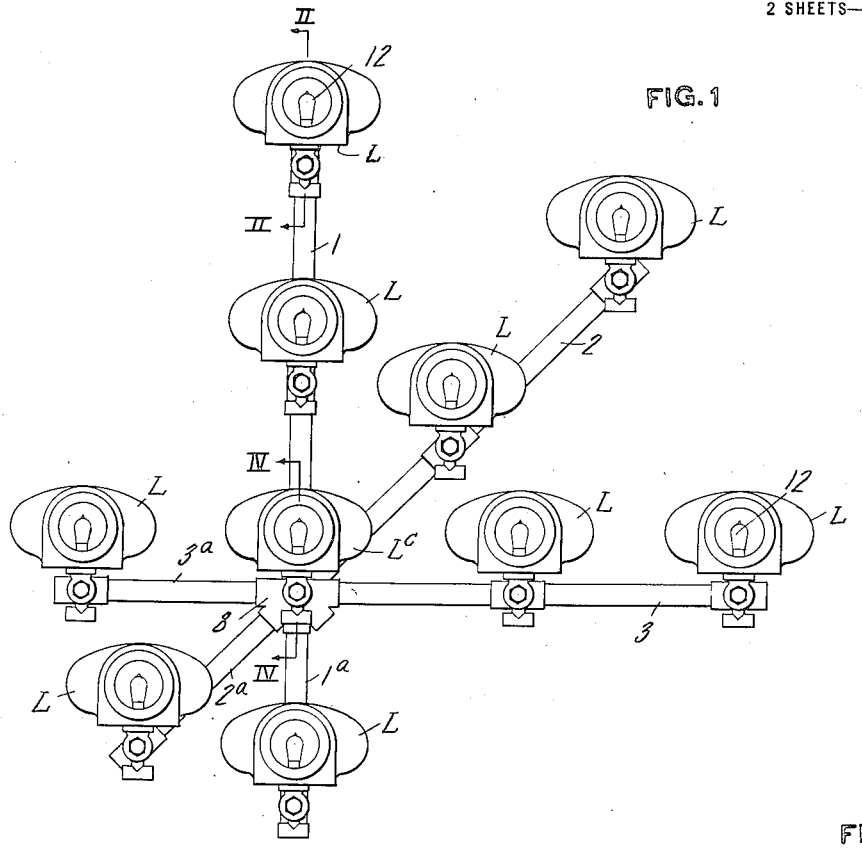

J. P. COLEMAN.
SIGNAL.
APPLICATION FILED JULY 31, 1914.

1,211,676.

Patented Jan. 9, 1917.
2 SHEETS—SHEET 1.

WITNESSES

INVENTOR
John P. Coleman

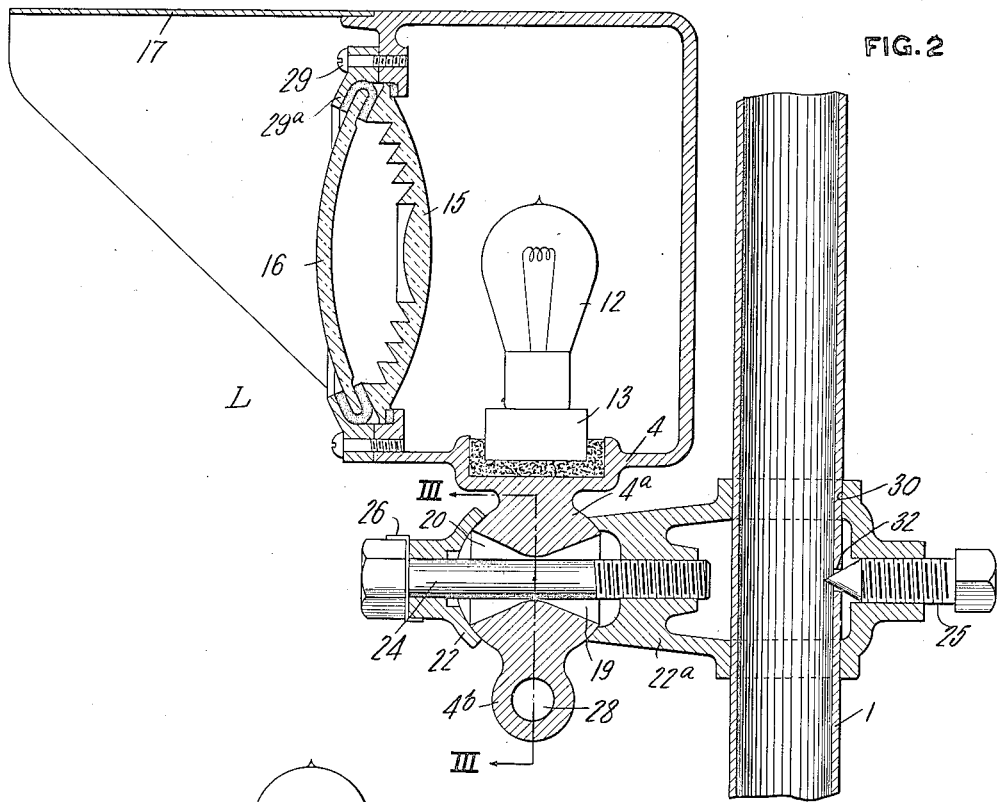
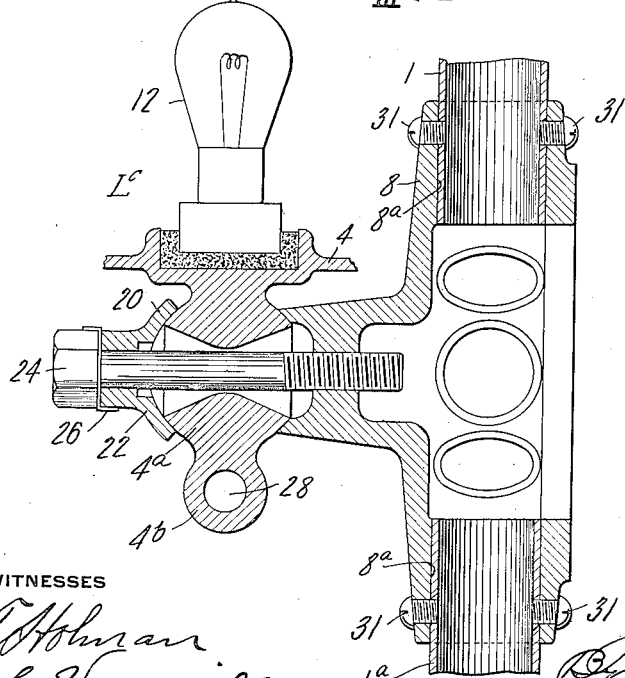

UNITED STATES PATENT OFFICE.

JOHN P. COLEMAN, OF EDGEWOOD BOROUGH, PENNSYLVANIA, ASSIGNOR, BY MESNE ASSIGNMENTS, TO THE POSITION-LIGHT SIGNAL COMPANY, A CORPORATION OF MAINE.

SIGNAL.

1,211,676.      Specification of Letters Patent.      Patented Jan. 9, 1917.

Application filed July 31, 1914. Serial No. 854,290.

*To all whom it may concern:*

Be it known that I, JOHN P. COLEMAN, a citizen of the United States, residing at Edgewood Borough, in the county of Allegheny and State of Pennsylvania, have invented certain new and useful Improvements in Signals, of which the following is a specification.

My invention relates to signals.

I will describe one form of signal embodying my invention, and will then point out the novel features thereof in claim.

In the accompanying drawings, Figure 1 is a view showing in front elevation one form of signal embodying my invention. Fig. 2 is a sectional view on the line II—II of Fig. 1 looking in the direction of the arrows and showing on an enlarged scale one light unit L and means for adjustably attaching this unit to the arm 1. Fig. 3 is a sectional view on the line III—III of Fig. 2 looking in the direction of the arrows. Fig. 4 is a partial sectional view on the line IV—IV of Fig. 1 looking in the direction of the arrows and showing the means for uniting the arms 1, $1^a$, 2, $2^a$, 3 and $3^a$, and also showing means for attaching the central light unit $L^c$ to the frame of the signal. Figs. 5 and 6 are views showing modifications of the structure shown in Fig. 2.

Similar reference characters refer to similar parts in each of the views.

Referring first to Fig. 1, the signal here shown comprises three arms 1—$1^a$, 2—$2^a$, and 3—$3^a$, disposed in respectively vertical, inclined and horizontal directions, these directions corresponding respectively to the "clear", "caution" and "danger" indications of a railway signal. As shown in Figs. 1 and 4, these arms are united by a central supporting member 8, and each arm comprises two sections of pipe which enter this supporting member in diametrically opposite directions. The supporting member is formed with eight radially disposed holes $8^a$ in which the pipes make a snug fit, which holes are disposed at angular distances of 45°. Only six of these holes are employed in the form of signal here shown. Each arm section is secured in its hole $8^a$ by screws 31 to prevent longitudinal and rotary movement.

Located at substantially equal distances along each arm of the signal are light units L, each containing a light source, by preference an incandescent lamp 12, each of which units is adjustably attached to its arm by means which I will hereinafter explain. A central light unit $L^c$ is adjustably attached to clamp member 8 by means which I will also hereinafter explain. The lamps 12 in the units L are divided into three groups comprising respectively the lamps on arm 1—$1^a$, those on arm 2—$2^a$, and those on arm 3—$3^a$, and these groups are so controlled by suitable means (not shown), such as a relay, that the lamps of any one group may be illuminated at a time. Then, in accordance with the usual practice in railway signaling, when the lamps on arm 1—$1^a$ are illuminated, the signal indicates "clear", when those on arm 2—$2^a$ are illuminated the signal indicates "caution", and when those on arm 3—$3^a$ are illuminated the signal indicates "danger". Preferably the lamp 12 in the central light unit $L^c$ burns continuously, although I do not regard as part of my invention either the control of the lights or the relative arrangement of the lamps, these being the substance of inventions conceived by others.

Referring now particularly to Fig. 2, each lamp unit L comprises a housing or lamp body 4 in which is mounted a base 13 carrying the lamp 12. This body is closed on the top and bottom, both sides, and back, and in its front is mounted a light projecting media or lens 15 adapted to project the light from lamp 12 in a beam of substantially parallel rays. Mounted also in the front of the lamp body by screws 29 and a ring $29^a$ is a cover glass 16; these cover glasses may be all of the same color, or all colorless, or the glasses may be of different colors for the lamps giving the clear, caution and danger indications respectively. Attached also to the body 4 is a hood 17 which serves to shield the lens 15 and glass 16 from outside light coming from above and from the sides.

The lamp body 4 is adjustably attached to arm 1 by means which I will now explain. Integral with the bracket 4 and depending therefrom is a ball $4^a$ as shown in Figs. 2 and 3. This ball $4^a$ is provided with a central aperture in the form of two diametrically opposite cone-shaped holes 19 and 20, each of which tapers from a minimum diameter at the center of the ball to a maximum diameter at the surface. This ball is attached to the arm 1 by a bracket comprising two members 22 and 22$^a$ each of which is provided with a concave surface matching the surface of the ball. Clamp member 22$^a$ is provided with a hole 30 through which the arm 1 may pass, and this member is fixed in the desired position on the arm by a set screw 25. As here shown, the screw 25 is pointed and enters a hole 32 in the arm 1, thereby assuring that the light unit shall be mounted at a predetermined point on the arm. The two clamp members and the ball 4$^a$ are clutched together by a screw 24 which passes through member 22, the holes in ball 4$^a$ and into a tapped hole in member 22$^a$. It will be seen, therefore, that the light unit is attached to the arm 1 by a universal joint so that the unit may be swung through a complete circle in a vertical plane around the center line of screw 24 as an axis, and when at any point in this circle it can also be swung through a limited angle in any direction because the ball 4$^a$ may swing in any direction around its center as a pivotal point. Hence the lamp 12 may occupy any position in a circle whose center is the axis of bolt 24, and when in any position in this circle it may be swung in any direction so that the beam projected by the light unit lies anywhere in a cone whose apex is at the signal. This flexibility of adjustment is important.

The central light unit L$^c$ is, as here shown, adjustably mounted on the supporting member 8 in substantially the same way as the other units are mounted on the arms; that is, the ball 4$^a$ is grasped between the member 8 and a clamp member 22, both of which are provided with concave surfaces to fit the ball, and the ball is held rigid by a screw 24.

After the entire signal is assembled, the bolts 24 are loosened and the light units are then so adjusted with respect to the arms that the beams from the several units are all directed at substantially the same point, so that these beams are all equally visible from any location in front of the signal. The bolts are then tightened and are locked by nut locks 26. Whenever it is necessary to renew a lamp 12, if the filament of the new lamp occupies a different position from that of the old one with respect to the lens 15, the corresponding light unit may be readjusted by loosening the bolt 24 and swinging the unit until the beam projected thereby is directed toward the same point as the beams from the other units.

In order to facilitate adjustment of the units, the lamp bracket 4 of each unit is preferably provided with a projection 4$^b$ having an eye 28 adapted to accommodate a portable lever by means of which the unit may be delicately adjusted when the bolt 24 is loosened.

The structure shown in Fig. 2 for mounting the light unit on the radial arms is susceptible of modification, for example, as shown in Figs. 5 and 6. In Fig. 5 the lamp body 4 is provided with a member 4$^c$ having a convex surface on one side and a concave surface on the other, and clamp members 22 and 22$^b$ are provided respectively with concave and convex surfaces matching the surfaces of member 4$^c$. Member 4$^c$ is clamped between members 22 and 22$^b$ by a bolt 24, and the member 4$^c$ is provided with a flaring hole 20$^a$. The light unit is therefore capable of the same wide range of adjustment as with the structure shown in Fig. 2.

In Fig. 6 the lamp body 4 is provided with a downwardly extending member 4$^d$ having a convex surface on one side, and this member is attached to clamp member 22$^c$ by a bolt 24$^a$ having a ball-shaped head, member 4$^d$ being grasped between member 22$^c$ and a nut 24$^b$. The clamp member 22$^c$ is provided with a convex surface on one side and a concave surface on the other, which surfaces match respectively the concave surface on the member 4$^d$ and the convex surface of the head of bolt 24$^a$. The hole 20$^b$ in clamp member 22$^c$ through which the bolt passes is flared, hence the unit is capable of the same wide range of adjustment as with the structure shown in Fig. 2.

Other modifications of the structure for adjustably attaching the light units to the radial arms will readily suggest themselves to those skilled in the art.

Obviously, the central light unit L$^c$ can be attached to the member 8 by means of structure similar to that shown in Fig. 5 or Fig. 6.

I do not make any claim to the use of lights for signaling both by day and by night, nor to any disposition of these lights with relation to each other, nor to the control and operation of the lights in any manner, nor to any novelty except such as pertains to the structural design of the lamps and supporting frame to obtain extreme flexibility of adjustments and simplicity in both the manufacture and use of the character of signal to which my invention relates.

Although I have here shown and described only certain forms of apparatus embodying my invention, it is understood that various changes and modifications may be made therein within the scope of the appended claim without departing from the spirit and scope of my invention.

Having thus described my invention, what I claim is:

A light signal comprising a central supporting member, a plurality of arms radiating therefrom in a vertical plane corresponding to different signal indications, a plurality of apertures formed in each of the arms at predetermined intervals and concentric with the central supporting member, a plurality of light signal units adapted to be supported by the said arms, each unit comprising a housing adapted to a light source and light-projecting media, a ball projecting from the said housing and provided with a central aperture, brackets carried by the said arms and capable of sliding movement thereon, a set screw carried by the said bracket for engagement with the apertures formed in the said arms, a screw carried by the said bracket and adapted to pass through the aperture formed in said ball, and a clamping member carried by the last-named screw and adapted to engage said ball and clamp the same when said screw is turned.

In testimony whereof I affix my signature in presence of two witnesses.

JOHN P. COLEMAN.

Witnesses:
A. HERMAN WEGNER,
R. L. KISTLER.